Sept. 20, 1932. F. M. COVEY 1,877,821
AIRCRAFT PROPELLER
Filed Nov. 24, 1930
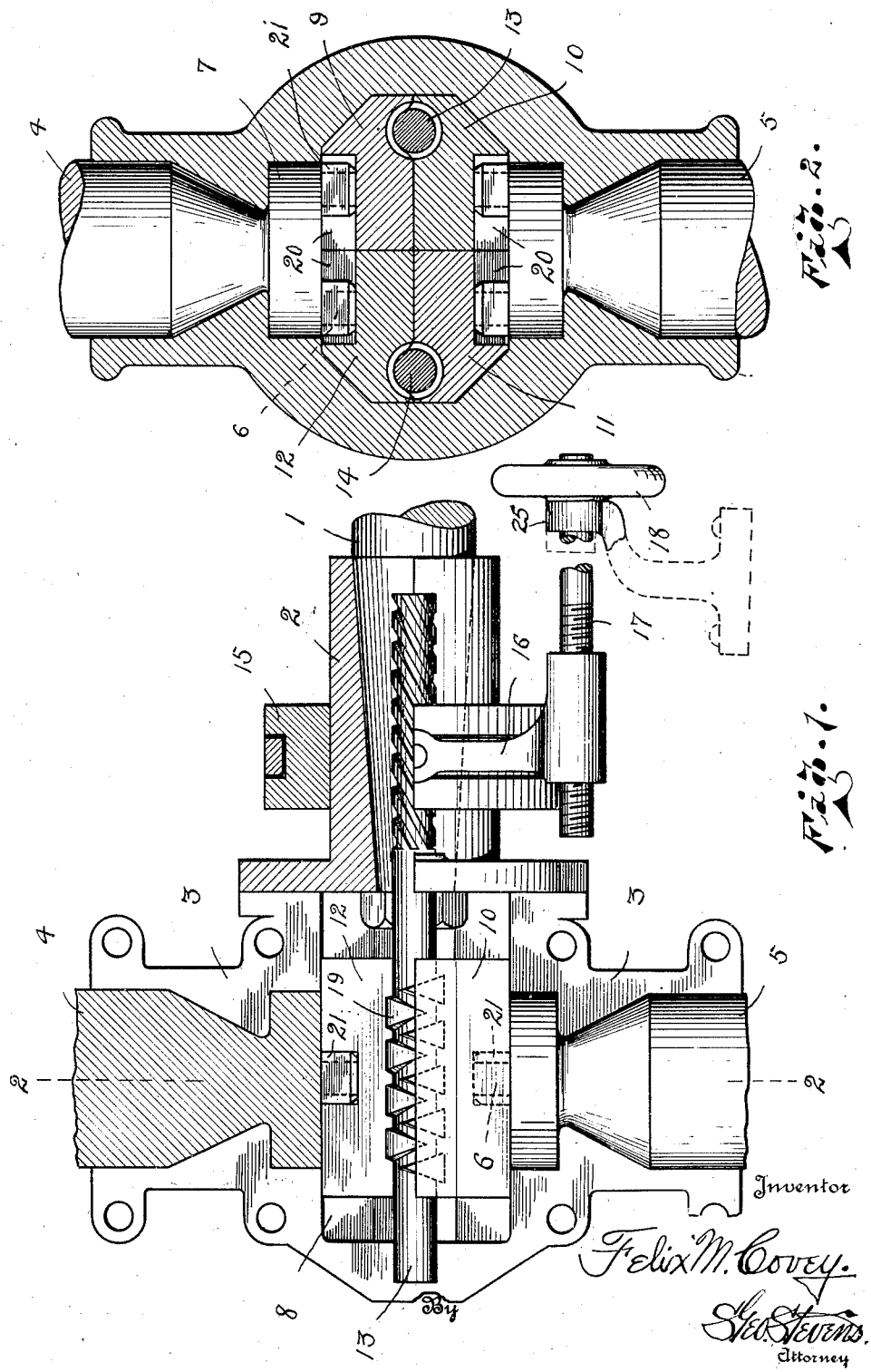

Patented Sept. 20, 1932

1,877,821

UNITED STATES PATENT OFFICE

FELIX M. COVEY, OF DULUTH, MINNESOTA

AIRCRAFT PROPELLER

Application filed November 24, 1930. Serial No. 497,828.

This invention relates to adjustable screw propellers and has special reference to novel means for accomplishing such adjustment.

The main object of the invention is to provide a more practical, efficient, and simple mechanism for such purpose than heretofore known.

In the accompanying drawing, forming part of this application, and wherein like reference characters indicate like parts:

Figure 1 is a half section and side elevation of the forward end of a propeller shaft and hub, such as adapted for use on an airplane; and Figure 2 is a section on the line 2—2, Figure 1.

1 represents the outer end of the propeller driving shaft which extends outwardly of the housing, for instance, of an aircraft, and 2 represents a hollow sleeve mounted upon the end of the shaft and to which is bolted the two-part separable hub member 3.

Within the hub member are rotatably mounted the propeller blade shanks 4 and 5, they, together with the hub and previously described assembly, being of substantially a standard type. Each propeller shank has inwardly protruding therefrom a pair of pintles 6 they being fixed within the disc-like terminus 7 of the blade shanks. These pintles extend within the rectangularly shaped chamber 8 forming the hollow within the hub, and within this chamber are slidably mounted the four cooperative cross head members 9, 10, 11, and 12. Referring to such members as being in pairs, the pair 9—10 is mounted upon the worm shaft 13, and the pair 11—12 is mounted upon the worm shaft 14; said shafts extending longitudinally of the driving shaft 1 of the propeller and externally thereof as well as of the sleeve 2, adjacent which they are upon opposite sides where they are mounted within the collar 15 upon said sleeve 2, as they together with the sleeve rotate with the propeller shaft. The portions of the worm shaft extending through the collar 15 are externally screw threaded, as illustrated, the pitch of said threaded portions being suitable for the purpose of rotating said shafts when the collar 15 is reciprocated upon the sleeve 2.

Selective reciprocation of the collar 15 may be accomplished by any suitable mechanism, but for convenience I have illustrated a simple reciprocable fork-like member mounted within said collar, it being of the common clutch-like structure 16 the hub portion of which is directly operable upon the rotative screw-threaded shaft 17 provided with a suitable fixed bearing 25 and the hand wheel 18.

The screw portion 19 upon each shaft 13 and 14 is of the reverse thread type, that is to say, both a right and left hand thread is formed in the same area, this being the area occurring centrally of each pair of blocks and designed for the purpose of simultaneously operating the two halves of the block in opposite directions, as one of the blocks has a right hand thread for cooperation with the right hand thread of the worm, while the other block has a left hand thread for cooperation with the left hand thread of the worm. Thus, when the shaft is rotated, one block, or half nut, for example 9, travels in one direction, and the other block or half nut 10, travels in the opposite direction. The same is true of the opposite pair of blocks 11 and 12, except that the diametrically opposite blocks operate in opposite directions, for, as is obvious, the rotation of the blades must be in opposite directions.

The cooperation between the respective blocks and the shanks of the blades, is accomplished by each block having a transverse channel therein as indicated at 20, and into which channels the respective pintles 6 extend, they each being surrounded by a rectangularly shaped pilot nut indicated at 21, by virtue of which, as each pintle snugly fits within its respective nut and the nuts closely fit within the channels in which they slide, a close and tight contact is assured. There being two such contacts for each blade shank, a positive and dependable action of the mechanism is assured, it being perfectly balanced and free from possible injurious vibration.

It will further be obvious that the device could function admirably with but one pair of half nuts and one worm, but the preferred arrangement is as shown which results in the least vibration possible.

Having thus described my invention, what I claim and desire to secure by Letters Patent, is:

1. The combination with a hollow propeller hub fixed to the end of a driving shaft and having rotatably adjustable blades extending within the hub, of a pair of rotatable spindles disposed parallel with the shaft and extending within the hub, reciprocable means upon the spindles externally of the hub for rotating same simultaneously in either direction, a pair of slidable members upon each spindle within the hub, diametrically opposed pintles carried upon the extremity of each propeller blade within the hub, the diagonally opposite ones of which travel in the same direction and operable by the slidable members.

2. Feathering mechanism including a hollow hub for propeller blades having a pair of pintles upon each shank thereof within the hub, consisting of four simultaneously reciprocal blocks within the hub, a rotatable worm shaft engaging each pair of blocks, and means for manually rotating the shafts in either direction.

3. Feathering mechanism including a hollow hub for propeller blades having pintles upon the shanks of the blades within the hub, characterized by having four slidable blocks snugly nested together within the hub, a rotatable worm shaft for operating each pair of blocks connected with like opposite pintles on the two shanks.

4. Feathering mechanism including a hollow hub for propeller blades having pintles upon the shanks thereof within the hub, comprising in combination four simultaneously operable half nuts, two of said nuts engaging the pintles on one blade and the other two the pintles on the other blade, a worm shaft for operating each pair of nuts, and means for selectively rotating said worm shafts.

5. A structure as set forth in claim 4, further characterized by all of the half nuts slidably engaging each other and the inner walls of the hub.

In testimony whereof I affix my signature.

FELIX M. COVEY.